(12) United States Patent
Jamtvedt et al.

(10) Patent No.: US 9,139,709 B2
(45) Date of Patent: Sep. 22, 2015

(54) ARTICLE

(75) Inventors: Svein Jamtvedt, Blabarv (NO);
Balakantharao Kona, Brevik (NO)

(73) Assignee: Borealis Technology OY, Porvoo (FI)

( * ) Notice: Subject to any disclaimer, the term of this patent is extended or adjusted under 35 U.S.C. 154(b) by 81 days.

(21) Appl. No.: 12/672,372

(22) PCT Filed: Aug. 8, 2008

(86) PCT No.: PCT/EP2008/006544
§ 371 (c)(1),
(2), (4) Date: Apr. 14, 2010

(87) PCT Pub. No.: WO2009/021686
PCT Pub. Date: Feb. 19, 2009

(65) Prior Publication Data
US 2011/0132864 A1    Jun. 9, 2011

(30) Foreign Application Priority Data

Aug. 10, 2007  (EP) ................................... 07253139

(51) Int. Cl.
*B65D 41/04*    (2006.01)
*C08L 23/16*    (2006.01)
*C08K 5/00*     (2006.01)
*B65D 1/02*     (2006.01)

(52) U.S. Cl.
CPC ............. *C08K 5/0008* (2013.01); *B65D 1/0246* (2013.01); *C08K 5/005* (2013.01); *C08K 5/0075* (2013.01); *C08K 5/0083* (2013.01); *C08K 2201/012* (2013.01)

(58) Field of Classification Search
CPC ..... C08L 23/10; C08L 23/0815; C08L 23/26; C08L 23/12; C08L 2666/06; C08L 2314/06; C08K 5/0008; C08K 5/0005; C08K 5/0083; C08K 2201/012; C09K 2200/062; C09J 123/14; C09J 123/10; C09J 123/12; C08F 210/06; C08F 10/00; C08F 2500/05; Y10S 526/943; B65D 1/0246
USPC .......................................... 428/35.7; 215/329
See application file for complete search history.

(56) References Cited

U.S. PATENT DOCUMENTS

| | | | |
|---|---|---|---|
| 3,887,534 A | 6/1975 | Baba et al. | |
| 4,234,624 A | 11/1980 | Linder roth et al. | |
| 4,493,923 A | 1/1985 | McCullough, Jr. et al. | |
| 4,508,872 A | 4/1985 | McCullough, Jr. et al. | |
| 4,599,391 A | 7/1986 | Yamamoto et al. | |
| 4,639,386 A | 1/1987 | Akao | |
| 4,677,007 A | 6/1987 | Murray et al. | |
| 4,696,979 A | 9/1987 | Shiga et al. | |
| 4,871,819 A | 10/1989 | Oonishi et al. | |
| 4,994,539 A | 2/1991 | Orikasa et al. | |
| 5,286,540 A | 2/1994 | Suga et al. | |
| 5,317,035 A | 5/1994 | Jacoby et al. | |
| 5,457,016 A | 10/1995 | Dethlefs | |
| 5,486,558 A * | 1/1996 | Lee | ................. 524/241 |
| 5,752,362 A | 5/1998 | Eichbauer et al. | |
| 5,773,123 A | 6/1998 | Anwyll, Jr. | |
| 6,265,055 B1 | 7/2001 | Simpson et al. | |
| 6,291,590 B1 | 9/2001 | Sainio et al. | |
| 6,440,509 B1 | 8/2002 | Littlejohn et al. | |
| 6,503,637 B1 | 1/2003 | Van Loon | |
| 6,559,232 B2 | 5/2003 | Inoue et al. | |
| 6,573,334 B1 * | 6/2003 | Pitteri et al. | ................. 525/240 |
| 6,583,241 B1 | 6/2003 | Beach et al. | |
| 6,733,717 B1 | 5/2004 | Marczinke et al. | |
| 6,770,714 B2 | 8/2004 | Ommundsen et al. | |
| 2005/0161866 A1 | 7/2005 | Batlaw et al. | |
| 2005/0200046 A1 | 9/2005 | Breese | |
| 2005/0234217 A1 | 10/2005 | Bigiavi et al. | |
| 2006/0142495 A1 | 6/2006 | Lalho et al. | |
| 2010/0003435 A1 | 1/2010 | Jaaskelainen et al. | |
| 2010/0009156 A1 | 1/2010 | Daviknes et al. | |
| 2010/0304062 A1 | 12/2010 | Daviknes et al. | |
| 2011/0028665 A1 | 2/2011 | Eriksson et al. | |
| 2011/0162869 A1 | 7/2011 | Smedberg | |
| 2011/0168427 A1 | 7/2011 | Smedberg et al. | |
| 2011/0180304 A1 | 7/2011 | Smedberg et al. | |
| 2011/0290529 A1 | 12/2011 | Pakkanen | |

FOREIGN PATENT DOCUMENTS

| | | |
|---|---|---|
| CN | 1676545 | 10/2005 |
| DE | 108546 | 9/1974 |
| EP | 0111602 | 6/1984 |
| EP | 0146270 | 6/1985 |
| EP | 0151883 | 8/1985 |
| EP | 0184362 | 6/1986 |
| EP | 0251340 | 1/1988 |
| EP | 0260791 | 3/1988 |

(Continued)

OTHER PUBLICATIONS

Moore, et al.—Polypropylene Handbook, Hanser Publishers, 1996.*
Chinese Office Action dated May 30, 2011, for Chinese application No. 200880102737.7.
English Abstract for Chinese application No. 1676545 published Oct. 5, 2005.
Brostar Heavy Duty Shipping Sacks (K IN0031/GB FF 2007 10, Borealis AG/Borouge AG/Borouge Pte Ltd.).
Brostar PE for blown film applications (K IN0052/GB FF 2007 10 BB, Borealis AG/Borouge AG/Borouge Pte Ltd.).
Office Action dated Feb. 23, 2011 for Chinese application No. 200780040208.4.
Datasheet 2002.
Datasheet 1125 2001.
International Search Report dated Apr. 2, 2010 for international application No. PCT/EP2009/063251.

(Continued)

*Primary Examiner* — Yan Lan
(74) *Attorney, Agent, or Firm* — Gardner Groff Greenwald & Villanueva, PC

(57) ABSTRACT

The present invention provides a cap or closure comprising a polypropylene composition, wherein said composition comprises: (i) a random propylene ethylene copolymer having an ethylene content of 3.3-7% wt, and (ii) an additive selected from an antistatic agent, an antioxidant, an acid scavenger and a nucleating agent.

9 Claims, No Drawings

(56) References Cited

FOREIGN PATENT DOCUMENTS

| | | |
|---|---|---|
| EP | 0309138 | 3/1989 |
| EP | 0463402 | 1/1992 |
| EP | 0585585 | 9/1992 |
| EP | 0517868 | 12/1992 |
| EP | 0688794 | 12/1995 |
| EP | 0735090 | 10/1996 |
| EP | 0903356 | 3/1999 |
| EP | 0928797 | 7/1999 |
| EP | 0949274 | 10/1999 |
| EP | 1170329 | 9/2002 |
| EP | 1333044 | 8/2003 |
| EP | 1375528 | 1/2004 |
| EP | 1488924 | 12/2004 |
| EP | 1674238 | 6/2006 |
| EP | 1712574 | 10/2006 |
| EP | 1788023 * | 5/2007 |
| JP | 7238204 | 9/1995 |
| JP | 10036581 | 10/1998 |
| JP | 2000178404 | 6/2000 |
| JP | 2003138074 | 5/2003 |
| JP | 2004182955 | 7/2004 |
| WO | 9308222 | 4/1993 |
| WO | 9413707 | 6/1994 |
| WO | 9523829 | 9/1995 |
| WO | 9750093 | 5/1997 |
| WO | 9706951 | 12/1997 |
| WO | 9924478 | 5/1999 |
| WO | 9924479 | 5/1999 |
| WO | 9964509 | 12/1999 |
| WO | 9965039 | 12/1999 |
| WO | WO 00/32695 | 6/2000 |
| WO | 0071615 | 11/2000 |
| WO | 0202323 | 1/2002 |
| WO | WO 02/36672 | 5/2002 |
| WO | 02038383 | 8/2002 |
| WO | 02086916 | 10/2002 |
| WO | 03000740 | 1/2003 |
| WO | 03002625 | 1/2003 |
| WO | 03064519 | 8/2003 |
| WO | 04000902 | 12/2003 |
| WO | 2004067654 | 8/2004 |
| WO | 2005074428 | 8/2005 |
| WO | 2005103132 | 11/2005 |
| WO | 2006037603 | 4/2006 |
| WO | 2006053740 | 5/2006 |
| WO | 2006065799 | 6/2006 |
| WO | 2006131266 | 12/2006 |
| WO | WO 2007/071445 * | 6/2007 |
| WO | WO2007071447 | 6/2007 |
| WO | 2008074493 | 12/2007 |
| WO | 2008009393 | 1/2008 |
| WO | 2010003649 | 1/2010 |
| WO | 2010003651 | 1/2010 |
| WO | 2011038886 | 4/2011 |

OTHER PUBLICATIONS

International Search Report dated Jan. 29, 2009 for international application No. PCT/US2008/010359.
International Search Report dated Nov. 12, 2009 for international application No. PCT/EP2009/004929.
International Search Report dated Nov. 12, 2009 for international application No. PCT/EP2009/004931.
International Search Report dated Oct. 15, 2009 for international application No. PCT/US2009/004930.
MDO Film Oreintated PE and PP Packaging film (2004 Borealis A/S; IN0128/GB FF 2004 10).
Tice—ILSI Europe Report Series 2002.
Myhre er al., Oreintated PE films; Expanding Oppurtunities with Brostar PE; Maack Specialty 2001.
Written Opinion dated Mar. 11, 2008 for international application No. PCT/EP2007/009918.
Atofina Polypropylene Random Copolymers product range Jun. 2003.
Borealis Brochure 2005.
Adebi J App Polym Sci vol. 101, 1456-1462, 2006.
Borealis Caps and Closures brochure, 2007.
Certificate of analysis 3510368, May 6, 2007.
Declaration by Mr Nieber 2011.
Invoice 26932717, 2007.
Letter of Plastics Enterprises Co, Ltd—Ed Callahan, 2011.
List of deliveries 2005.
Lot Analytical data, 2007.
Total Petrochemicals Polypropylene PPR7220, 2005.
Polypropylene European Product range Sep. 2006.
Press release RE450M0, 2007.
Product specs for 62220CM 2005.
Production Spec for 62220-ORG 2005.
Public use evidence for DR7021 in Pringles lids: Declaration by Wilson, 2011.

* cited by examiner

ARTICLE

IN THE CROSS-REFERENCE TO RELATED APPLICATIONS

This application claims priority to European Application No. 07253139.5, filed Aug. 10, 2007, which is hereby incorporated herein by reference in its entirety for all purposes.

BACKGROUND OF THE INVENTION

Propylene polymers have excellent heat and chemical resistance and, in the moulded form, have desirable mechanical properties such as stiffness and impact resistance. Propylene polymers are therefore an attractive option for the production of caps and closures which are used in a range of applications including sealing of food and drinks containers. In many of these applications, the cap or closure is in contact with the food or drink, undergoes sterilisation and is transported and stored prior to use.

An inherent problem associated with polypropylene caps and closures, however, is that interaction with light and oxygen may cause polymer degradation leading to a loss in mechanical performance as well as to the production of potential leachable compounds (i.e. compounds that may migrate out of the polymer into the food or drink). This is a particular issue in the use of polypropylene caps and closures in the food and drinks industry where leachables may effect the taste and odour of the product within the container. Leachables that are aldehydes or ketones are particularly problematic in this regard.

To prevent polymer degradation, it is commonplace to blend polypropylene with one or more stabilisers such as an antioxidant (e.g. an organophosphite or a hindered phenolic compound) and/or an acid scavenger. These compounds are designed to undergo transformation with oxygen and/or light in preference to the polymer and thus prevent its degradation. The stabilisers as well as the products produced during their transformation are, however, volatile organic compounds (VOCs) that may also effect the taste and odour of products in contact with the polymer.

Exactly the same problem is also encountered with other polymer additives that are commonly used to enhance polymer properties. Antistatic agents are often required to modify the precise properties of a propylene polymer and tailor them to the exact end application envisaged. Antistatic agents are, for example, often required to reduce build up of static electricity during storage. Like stabilisers, however, such agents are VOCs, and may produce VOCs, that potentially impact on the taste and odour of products in contact with the polymer.

As ever polymer processability is also vital. A propylene polymer which has good mechanical properties but which cannot be moulded is of little value. This is particularly important in the case of caps and closures which must be produced with fast cycle times and high productivity in order for the process to be economical. As a result polypropylene is often nucleated to improve its crystallisation and therefore processing properties. Nucleating agents are, however, a yet further source of VOCs that may impact upon taste and/or odour of food and drink that contacts the polymer.

The polymer chemist must therefore strive to provide caps and closures having the required mechanical and processing properties, but which are also organoleptically acceptable, i.e. VOCs are minimised.

Another critical feature of caps and closures is that they should have a high closing efficiency. This ensures that the product, e.g. liquid and/or gas, contained by the cap or closure cannot leak out and prevents any contaminants from entering therein. A high closing efficiency is particularly important for caps and closures designed for use on containers for carbonated drinks wherein the internal pressure of $CO_2$ gas may be quite high.

BRIEF SUMMARY OF THE INVENTION

The present invention relates to caps and closures comprising a polypropylene composition, to processes for preparing the caps and closures and to the polypropylene composition per se. The caps and closures of the invention are particularly suitable for use in the food and drinks industry due to their attractive organoleptic properties and high closing efficiency.

A need therefore exists for alternative caps and closures for use in the food and drinks industry that are organoleptically acceptable (e.g. have low VOCs), have the required processing and mechanical properties (e.g. high stiffness and impact resistance) and which also have a high closing efficiency. It has now surprisingly been found that caps and closures having these advantages may be prepared by moulding, particularly injection or compression moulding, a polypropylene composition which comprises a random propylene ethylene copolymer having an ethylene content of 3.3-7% wt and an additive.

DETAILED DESCRIPTION OF THE INVENTION

Thus viewed from one aspect the invention provides a cap or closure comprising a polypropylene composition, wherein said composition comprises:
(i) a random propylene ethylene copolymer having an ethylene content of 3.3-7% wt, and
(ii) an additive selected from an antistatic agent, an antioxidant, an acid scavenger and a nucleating agent.

Viewed from a further aspect the invention provides a process for making a cap or closure comprising moulding, preferably injection or compression moulding, a polypropylene composition, wherein said composition comprises:
(i) a random propylene ethylene copolymer having an ethylene content of 3.3-7% wt, and
(ii) an additive selected from an antistatic agent, an antioxidant, an acid scavenger and a nucleating agent.

Viewed from a still further aspect the invention provides use of a polypropylene composition as hereinbefore defined for the manufacture of a cap or closure by moulding, preferably by injection or compression moulding.

Viewed from a yet further aspect the invention provides a polypropylene composition comprising:
(i) a random propylene ethylene copolymer having an ethylene content of 3.3-7% wt, and
(ii) an additive selected from an antistatic agent, an antioxidant, an acid scavenger and a nucleating agent.

By the term "cap or closure" is meant any protective cover or seal that closes off a container. Various different types of caps and closures are well known in the art, e.g. screw caps, flip top caps, sports lock caps and wide mouth caps and all are encompassed within the scope of the present invention. Preferred caps or closures of the invention are sports lock caps.

As used herein the term "propylene ethylene copolymer" is intended to encompass polymers comprising repeat units from at least propylene and ethylene. In typical copolymers at least 1 wt %, preferably at least 2 wt %, more preferably at least 3 wt %, e.g. at least 5 wt % of repeat units derive from each of propylene and ethylene.

Copolymers may additionally comprise α-olefins having 4-10 carbon atoms. Examples of suitable monomers include but-1-ene, pent-1-ene, hex-1-ene and oct-1-ene. Preferred copolymers are formed solely from propylene and ethylene monomers (i.e. propylene ethylene bipolymers are preferred).

The propylene ethylene copolymer present in the composition of the invention is preferably multimodal, particularly preferably bimodal, with respect to comonomer content. Multimodality with respect to comonomer content may be achieved by use of a propylene ethylene copolymer comprising a propylene copolymer component and a propylene homopolymer component. Alternatively, two propylene copolymer components with different comonomer content may be present. In this latter case, the different copolymer components ensure that the propylene ethylene copolymer is multimodal. Preferably therefore, where two propylene copolymer components are present, the nature of the comonomers used in each component will be different and/or the amount of comonomers used in each component will be different, e.g. at least differing by 1 mol %, preferably at least 2 mol %, more preferably at least 3 mol %, still more preferably at least 5 mol %.

Whether the multimodal (e.g. bimodal) propylene ethylene copolymer comprises a propylene copolymer and a propylene homopolymer or two different propylene copolymers, it is preferred that at least 5% wt, more preferably at least 10% wt, still more preferably at least 20% wt, e.g. at least 30% wt of the total weight of polypropylene derives from each polymer.

Particularly preferred propylene ethylene copolymer for use in the invention comprises:

(A) at least 5% wt of a first component which is a propylene homopolymer or a propylene copolymer (e.g. propylene ethylene copolymer); and (B) at least 5% wt of a second component which is a propylene copolymer (e.g. propylene ethylene copolymer).

The propylene ethylene copolymer preferably comprises 10 to 90 wt % of polymer A, preferably 30 to 70 wt %, more preferably 40 to 60 wt % and most preferably 45 to 55 wt %. The polypropylene also preferably comprises 10 to 90 wt % of polymer B, preferably 30 to 70 wt %, more preferably 40 to 60 wt % and most preferably 45 to 55 wt %.

As used herein the term "homopolymer" is intended to encompass polymers which consist essentially of repeat units deriving from a single monomer. Homopolymers, may for example, comprise at least 99 mol %, preferably at least 99.5 mol %, more preferably at least 99.9 mol % of repeat units deriving from a single monomer.

As used herein the term "copolymer" is intended to encompass polymers comprising repeat units from two or more monomers. In typical copolymers at least 1 mol %, preferably at least 2 mol %, more preferably at least 3 mol %, e.g. at least 5 mol % of repeat units derive from each of at least two different monomers. The total amount of any α-olefin that is copolymerised with propylene may be up to 50 mol %, more preferably up to 20 mol %, e.g. up to 10 mol %.

Polymer A preferably comprises up to 5 mol % comonomer, more preferably up to 4 mol % comonomer. Where polymer A is copolymeric, the comonomer is preferably ethylene.

The $MFR_2$ of polymer A may be in the range 0.1 to 100 g/10 min, preferably 1 to 60 g/10 min, more preferably 2 to 50 g/10 min, e.g. 5 to 30 g/10 min.

The isotacticity of polymer A when it is a homopolymer may be as high as 98% although will preferably be at least 85%, e.g. in the range 90 to 95%.

The comonomer content of polymer B may be in the range 0.5 to 10 mol %, preferably 2 to 7 mol %, and most preferably 3 to 6 mol %. A preferred comonomer is ethylene.

Where both components A and B are copolymeric, it is preferred if polymer B has a higher comonomer content. Alternatively or additionally, polymer B may comprise a different comonomer to polymer A. The polypropylene present in the compositions of the invention may therefore be a terpolymer.

It will be appreciated that in certain circumstances it will be impossible to measure the properties of either polymer A or polymer B directly e.g. when a polymer is made second in a multistage process. The person skilled in the art will be able to work out the properties of each polymer from measurements taken on the first formed component and the overall properties of the polymer composition.

Polymer B generally has an $MFR_2$ of similar value to that of polymer A, e.g. within 5 g/10 min thereof, preferably within 3 g/10 min thereof.

The propylene ethylene copolymer used in the present invention is a random copolymer. By a random copolymer is meant herein that the comonomer (i.e. ethylene and any other $C_{4-10}$ α-olefin present) is distributed mainly randomly along the polymer chain. Any known olefin polymerisation catalyst may be used to make such polymers, e.g. metallocene or Ziegler Natta catalysts. Preferred random copolymers are those made using Ziegler Natta catalysts.

The propylene ethylene copolymer preferably comprises up to 6.5% wt ethylene, more preferably 3.3 to 6.0% wt ethylene, still more preferably 3.5 to 5.5% wt ethylene, e.g. 3.7 to 4.5% wt ethylene.

The propylene ethylene copolymer preferably has a melt flow rate in the range 0.1 to 100 g/10 min, preferably 1 to 60 g/10 min, more preferably 2 to 50 g/10 min, e.g. 5 to 30 g/10 min when measured according to ISO 1133 at 230° C. and a load of 2.16 kg.

The propylene ethylene copolymer used in the present invention is preferably multimodal, e.g. bimodal, with respect to molecular weight distribution (MWD), i.e. its molecular weight profile does not comprise a single peak but instead comprises the combination of two or more peaks (which may or may not be distinguishable) centred about different average molecular weights as a result of the fact that the polymer comprises two or more separately produced components. Preferably the copolymer comprises 10 to 90 wt % of a higher molecular weight component, preferably 30 to 70 wt %, more preferably 40 to 60 wt % and most preferably 45 to 55 wt %. The composition also preferably comprises 10 to 90 wt % of a lower molecular weight component, preferably 30 to 70 wt %, more preferably 40 to 60 wt % and most preferably 45 to 55 wt %.

Preferably the MWD of the propylene ethylene copolymer is in the range 1.5 to 10, more preferably 2 to 7, still more preferably 3 to 5, e.g. about 2 to 4.

The xylene soluble fraction of the propylene ethylene copolymer can range from 0.1 to 20%, preferably 1 to 15 wt %. Preferably the xylene soluble fraction of the polypropylene is less than 10 wt %, more preferably less than 7 wt %. The melting point of the polymer may range from 130 to 180° C., preferably around 140 to 160° C. The polymer is preferably partially crystalline, e.g. having a crystallinity of the order of 20 to 50%, e.g. 25 to 40%.

The polypropylene composition used in the present invention preferably comprises an antistatic agent. By the term "antistatic agent" is meant an agent which reduces the surface resistance of polypropylene. Such agents eliminate charge build-up and dust collection. Different types of antistatic agents may be used in polymerisation reactors to prevent the formed polymer powder from adhering to the reactor wall.

The antistatic agent present in the compositions of the invention may be any one which can generally be used for polypropylene. Specific examples thereof include cationic antistatic agents (e.g. primary amine salts, tertiary amines and quaternary ammonium compounds), anionic antistatic agents (e.g. sulfated oils, sulfated amide oils, sulfated ester oils, fatty alcohol sulfuric ester salts, alkyl sulfuric ester salts, fatty acid ethyl sulfonic acid salts, alkylsulfonic acid salts, alkylnaphthalene-sulfonic acid salts, alkylbenzene-sulfonic acid salts, and phosphoric esters), nonionic antistatic agents (e.g. partial fatty acid esters of polyhydric alcohols, ethylene oxide adducts of fatty alcohols, ethylene oxide adducts of fatty amines or fatty acid amides, ethylene oxide adducts of alkylphenols, ethylene oxide adducts of alkylnaphthols, polyethylene glycol, and fatty acid esters of alkyldiethanolamines) and amphoteric antistatic agents (e.g. carboxylic acid derivatives and imidazoline derivatives). Nonionic antistatic agents are preferred.

Particularly preferred antistatic agents are fatty acid esters. Examples of particularly preferred fatty acid esters are organic stearates and organic laurates (e.g. glycerol monolaurate). Especially preferred antistatic agents are glycerol monostearates (GMS). Representative examples of GMSs are GMS 90, GMS 60 and GMS40, which are all commercially available from, e.g. Danisco. GMS 90 is especially preferred.

Antistatic agents may be added to the compositions for use in the invention in an amount from about 0.01 percent to about 5 percent by weight based on the weight of the total composition. In most applications, however, less than about 1 percent by weight (based on weight of total composition) are required. In some applications, such compounds may be added in amounts from about 0.05 to about 5% (based on weight of total composition) to provide beneficial characteristics.

The polypropylene composition used in the present invention preferably comprises an antioxidant. By the term "antioxidant" is meant an agent which is able to inhibit radical reactions in the polymer and thus prevent degradation processes. Different types are available including sterically hindered phenols and organophosphites.

Preferably the polypropylene composition comprises an antioxidant that is a sterically hindered phenol. Examples of suitable compounds include vitamin E, 1,3,5-Tris(3'5'-di-tert butyl-4'-hydroxybenzyl)-isocyanurate, 2,6-di-tert butyl-4-methyl phenol, pentaerythrityl-tetrakis(3-(3',5'-di tert butyl-4-hydroxyphenyl)propionate, octadecyl 3-(3',5'-di tert butyl-4-hydroxyphenyl)propionate, 1,3,5-tri-methyl-2,4,6-tris-(3, 5-di tert butyl-4-hydroxyphenyl benzene) and bis-(3,3-bis-(4'-hydroxy-3'-tert butylphenyl)butanic acid)glycoester. A particularly preferred antioxidant is pentaerythrityl-tetrakis (3-(3',5'-di tert butyl-4-hydroxyphenyl)propionate. This is commercially available from, e.g. Ciba, under the tradename Irganox 1010.

Preferably the polypropylene composition comprises an antioxidant that is an organophosphite. Examples of suitable organophosphites include Tris(2,4-di-t-butylphenyl)phosphate and Bis(2,4-di-t-butylphenyl)-pentaerythrityl-di-phosphite. A particularly preferred antioxidant is Tris(2,4-di-t-butylphenyl)phosphate. This is commercially available from, e.g. Ciba under the tradename Irgafos 168. Another preferred antioxidant is Doverphos S-9228, which is commercially available from Dover Chemical Corporation.

A commercially available antioxidant that is particularly preferred for use in the practice of the present invention is Irganox B225. It comprises a mixture of Tris(2,4-di-t-butylphenyl)phosphate (Irgafos 168) and pentaerythrityl-tetrakis(3-(3',5'-di tert butyl-4-hydroxyphenyl)propionate (Irganox 1010).

Antioxidant may be added to the compositions for use in the invention in an amount from about 0.01 percent to about 1 percent by weight based on the weight of the total composition. In most applications, however, less than about 0.5 percent by weight (based on weight of total composition) are required. In some applications, such compounds may be added in amounts from about 0.05 to about 0.5% (based on weight of total composition) to provide beneficial characteristics.

The polypropylene composition used in the present invention preferably comprises a nucleating agent. Any conventional nucleating agent may be used, e.g. a non-polymeric nucleating agent (e.g. aromatic or aliphatic carboxylic acids, aromatic metal phosphates, sorbitol derivatives and talc) or a polymeric nucleating agent. Preferably a non-polymeric nucleating agent is used, especially a sorbitol derivative.

Suitable non-polymeric nucleating agents include dibenzylidene sorbitol compounds (such as unsubstituted dibenzylidene sorbitol (DBS), p-methyldibenzylidene sorbitol (MDBS), 1,3-O-2,4-bis(3,4-dimethylbenzylidene)sorbitol (DMDBS) available from Milliken under the trade name Millad 3988)), sodium benzoate, talc, metal salts of cyclic phosphoric esters (such as sodium 2,2'-methylene-bis-(4,6-di-tert-butylphenyl)phosphate (from Asahi Denka Kogyo K. K., known as NA-11), and cyclic bis-phenol phosphates (such as NA-21, also available from Asahi Denka)), metal salts (such as calcium) of hexahydrophthalic acid, and the unsaturated compound of disodium bicyclo[2.2.1]heptene dicarboxylate, known as HPN-68 available from Milliken. Dibenzylidene sorbitol derivatives are preferred.

Commercially available products preferred for use in the practice of the present invention include Millad 3988 (3,4-dimethyldibenzylidene sorbitol) available from Milliken, NA-11; (sodium 2,2-methylene-bis-(4,6, di-tert-butylphenyl)phosphate, available from Asahi Denka Kogyo, and NA-21 (aluminum bis[2,2'-methylene-bis-(4,6-di-tert-butylphenyl)phosphate]), from Asahi Denka Kogyo. 3,4-dimethyldibenzylidene sorbitol, e.g. Millad 3988, is especially preferred.

Non-polymeric nucleating agents may be added to the compositions for use in the invention in an amount from about 0.01 percent to about 10 percent by weight based on the weight of the total composition. In most applications, however, less than about 3.0 percent by weight (based on weight of total composition) are required. In some applications, such compounds may be added in amounts from about 0.05 to about 0.3% (based on weight of total composition) to provide beneficial characteristics.

The polypropylene composition used in the present invention preferably comprises an acid scavenger. By acid scavenger is meant a compound that can neutralise acidic residues that are present, or are formed, within the polymer. Any conventional acid scavenger may be used, e.g. a metal stearate or a synthetic hydrotalcite (SHT). An example of a SHT is DHT-4A. Particularly preferred acid scavengers for use in the compositions of the invention are Zn-stearate or Ca-stearate, especially calcium stearate. Such acid scavengers are commercially available from, e.g. Faci. The stearate may be blended to the coated polymer particles as a fine powder or may be deposited onto the polymer powder as part of an additive mixture.

Acid scavengers may be added to the compositions for use in the invention in an amount from about 0.01 percent to about 5 percent by weight based on the weight of the total composition. In most applications, however, less than about 3.0 percent by weight (based on weight of total composition) are required. In some applications, such compounds may be added in amounts from about 0.05 to about 0.3% (based on weight of total composition) to provide beneficial characteristics.

Preferred polypropylene compositions for use in the invention comprise at least two agents, more preferably at least three agents, selected from an antistatic agent, an antioxidant, a nucleating agent and an acid scavenger. Especially preferred polypropylene compositions comprise an antistatic agent, an antioxidant, a nucleating agent and an acid scavenger.

Particularly preferred polypropylene compositions comprise an organic stearate (e.g. glycerol monostearate), an organophosphite (e.g. Tris(2,4-di-t-butylphenyl)phosphate), a sterically hindered phenol (e.g. pentaerythrityl-tetrakis(3-(3',5'-di tert butyl-4-hydroxyphenyl)propionate), a dibenzylidene sorbitol derivative (e.g. 3,4-dimethyldibenzylidene sorbitol) and a metal stearate (e.g. calcium stearate).

In addition to the above-mentioned additives, the polypropylene composition of the invention may comprise other additives, e.g. lubricants, anti-fogging agents, colourants, antimicrobials, UV absorbers, clarifiers, plasticizers, flame retardants, light stabilisers, pigments, foaming agents, IR absorber, e.g. Sb and carbon black etc. A filler may also be present (e.g. talc).

The total amount of additives present in the polypropylene composition is preferably 0.05 to 10%, more preferably 0.1 to 5%, still more preferably 0.3 to 1% by weight based on the total weight of the composition.

The polypropylene present in the compositions of the invention may be prepared by simple blending (e.g. melt blending, preferably extrusion blending), by two or more stage polymerisation or by the use of two or more different polymerisation catalysts in a one stage polymerisation. Blending may, for example, be carried out in a conventional blending apparatus (e.g. an extruder). Random propylene ethylene copolymers that may be used in this invention are commercially available from various suppliers, e.g. Borealis GmbH.

Alternatively the polypropylene may be produced in a multi-stage polymerisation using the same catalyst, e.g. a metallocene catalyst or preferably a Ziegler-Natta catalyst. In a preferred multi-stage polymerisation a bulk polymerisation, e.g. in a loop reactor, is followed by a gas phase polymerisation in a gas phase reactor. A preferred bulk polymerisation is a slurry polymerisation. Conventional cocatalysts, supports/carriers, electron donors etc. can be used.

A loop reactor—gas phase reactor system is described in EP-A-0887379 and WO92/12182, the contents of which are incorporated herein by reference, and is marketed by Borealis GmbH, Austria as a BORSTAR reactor system. The propylene copolymer used in the invention is thus preferably formed in a two stage process comprising a first bulk (e.g. slurry) loop polymerisation followed by gas phase polymerisation in the presence of a Ziegler-Natta catalyst.

With respect to the above-mentioned preferred bulk (e.g. slurry)-gas phase process, the following general information can be provided with respect to the process conditions.

A temperature of from 40° C. to 110° C., preferably between 60° C. and 100° C., in particular between 80° C. and 90° C. is preferably used in the bulk phase. The pressure in the bulk phase is preferably in the range of from 20 to 80 bar, preferably 30 to 60 bar, with the option of adding hydrogen in order to control the molecular weight being available. The reaction product of the bulk polymerization, which preferably is carried out in a loop reactor, is transferred to a subsequent gas phase reactor, wherein the temperature preferably is within the range of from 50° C. to 130° C., more preferably 80° C. to 100° C. The pressure in the gas phase reactor is preferably in the range of from 5 to 50 bar, more preferably 15 to 35 bar, again with the option of adding hydrogen in order to control the molecular weight available. The residence time can vary in the reactor zones identified above. The residence time in the bulk reaction, for example the loop reactor, may be in the range of from 0.5 to 5 hours, for example 0.5 to 2 hours. The residence time in the gas phase reactor may be from 1 to 8 hours.

The properties of the polypropylene produced with the above-outlined process may be adjusted and controlled with the process conditions as known to the skilled person, for example by one or more of the following process parameters: temperature, hydrogen feed, ethylene feed, propylene feed, catalyst, type and amount of external donor and the split between two or more components of the polymer.

Preferably, the first polymer of the polypropylene of the invention is produced in a continuously operating loop reactor where propylene and ethylene is polymerised in the presence of a polymerisation catalyst (e.g. a Ziegler Natta catalyst) and a chain transfer agent such as hydrogen. The diluent is typically an inert aliphatic hydrocarbon, preferably isobutane or propane.

The second polymer can then be formed in a gas phase reactor using the same catalyst. Prepolymerisation can be employed as is well known in the art. Ziegler-Natta catalysts are preferred. The nature of the preferred Ziegler-Natta catalyst is described in numerous prior publications, e.g. U.S. Pat. No. 5,234,879.

The additives present in the polypropylene compositions for use in the invention may be introduced by conventional techniques, e.g. by blending.

The polypropylene composition of the present invention is particularly suitable for manufacture of caps and closures by moulding, especially injection moulding or compression moulding. Injection moulding is particularly preferred.

In the preparation of caps and closures by moulding it is important that their dimensions are exactly as intended. This is critical otherwise they will not connect to, or engage with, the container it is designed to fit. An advantage of the polymer compositions of the present invention is that they yield caps and closures having high closing efficiency. Preferred caps and closures of the present invention do not allow any gas to escape under the conditions set out in the examples described below.

Moreover the caps and closures that result from moulding have excellent organoleptic properties. Total VOC values of less than 6 ppb, more preferably less than 5 ppb, e.g. 0.5 to 5 ppb may be achieved.

Furthermore the caps and closures of the invention have excellent transparency. Haze values (as determined by the method described in the examples) of less than 40%, preferably less than 30%, more preferably less than 25% are obtainable.

The invention will now be described with further reference to the following non-limiting examples.

EXAMPLES

Analytical Tests

Values quoted in the description/examples are measured according to the following tests:

Melt flow rate (MFR$_2$) was measured according to ISO 1133 at 230° C. and a load of 2.16 kg.

Density is measured according to ISO 1183

Comonomer content was determined in a known manner based on FTIR measurements calibrated with $^{13}$C NMR.

The weight average molecular weight, Mw and the molecular weight distribution (MWD=Mw/Mn wherein Mn is the number average molecular weight) is measured by a method based on ISO 16014-4:2003. A waters 150CV plus instrument was used with column 3×HT&E styragel from Waters (divinylbenzene) and trichlorobenzene (TCB) as solvent at 140° C. The column set was calibrated using universal calibration with narrow MWD PS standards (the Mark Hoiwinks constant K: 9.54×10$^{-5}$ and a: 0.725 for PS, and K: 3.92×10$^{-4}$ and a: 0.725 for PE).

The xylene soluble fraction (XS) was determined as follows: 2.0 g of polymer are dissolved in 250 ml p-xylene at 135° C. under agitation. After 30± minutes, the solution was allowed to cool for 15 minutes at ambient temperature and then allowed to settle for 30 minutes at 25±0.5° C. The solution was filtered with filter paper into two 100 ml flask. The solution from the first 100 ml vessel was evaporated in nitrogen flow and the residue dried under vacuum at 90° C. until constant weight is reached. Xylene soluble fraction (percent) can then be determined as follows:

$$XS\% = (100 \times m_1 \times v_0)/(m_0 \times v_1),$$

wherein $m_0$ designates the initial polymer amount (grams), $m_1$ defines the weight of residue (grams), $v_0$ defines the initial volume (milliliter) and $v_1$ defines the volume of analyzed sample (milliliter).

The solution from the second 100 ml flask was treated with 200 ml of acetone under vigorous stirring. The precipitate was filtered and dried in a vacuum oven at 90° C. This solution can be employed in order to determine the amorphous part of the polymer (AM) using the following equation:

$$AM\% = (100 \times m_1 \times v_0)/(m_0 \times v_1)$$

wherein $m_0$ designates the initial polymer amount (grams), $m_1$ defines the weight of residue (grams), $v_0$ defines the initial volume (milliliter) and $v_1$ defines the volume of analyzed sample (milliliter).

Melting temperature (T$_m$), crystallization temperature (T$_c$) and degree of crystallinity (X$_c$) were measure according to ISO11357. The samples were cut from compression molded, 0.2 mm films. The measurements were performed at the following conditions:

| Stage | Temperature Program | Heating/Cooling Rate ° C./min | Time min |
| --- | --- | --- | --- |
| 1$^{st}$ heating | 20-225° C. | 10 | |
| Isothermal | 225° C. | | 5 |
| Cooling | 225-20° C. | −10 | |
| Isothermal | 20 | | 1 |
| 2$^{nd}$ heating | 20-225° C. | 10 | |

The T$_m$ and X$_c$ were determined from the second heating. The degree of crystallinity (Xc) was calculated using a melting enthalpy of 100% PP equal to 209 J/g.

Haze was measured on injection moulded plaques according to ASTM D1003 at a thickness of 2 mm unless otherwise indicated.

VOC (volatile organic compounds) was measured on pellets according to Environmental Protection Agency (EPA) method no. 524.2. The storage conditions were: 10 g pellet in 200 ml water at 55° C. for 3 days.

Shelf life was determined by exposing injection moulded plaques in air in an oven at 135° C.

Closing Efficiency was determined in both static and dynamic modes. The caps are screwed to bottles with certain application torque (17 in-lbs). The bottles are immersed into a water tub. The test is done at cold (+22° C.) and warm (+50° C.) water conditions. In the static test pressure is applied for 2 minutes and in the dynamic test pressure is applied with a load of 50N for 2 min on the caps. Then the caps are tested for its closing efficiency at different pressure levels (i.e. by applying pressure from inside the bottles) The bottles are immersed in water and bubble formation at different pressures is observed (if the closing is not complete air bubbles are observed due to the leakage of air pressure). The same tests are repeated at various dynamic loads and different temperatures.

Organoleptic performance was assessed by placing 25 g pellets of the polypropylene composition in 1 liter glass bottles of Evian water (having glass closures) for 48 hours at 60° C. and then comparing the taste of the resulting water to Evian water that had not been exposed to the composition.

Materials

The following polypropylene compositions were employed in the examples:

| PP random copolymer | | | Additives (ppm wt) | | |
| --- | --- | --- | --- | --- | --- |
| C$_2$ (% wt) | MFR$_2$ (g/10 min) | GMS 90 | Antioxidant | Ca-stearate (AS110) | Nucleating Agent |
| 1# 3.0 | 13 | 600 | Irganox B 225 (1000) | 1000 | Millad 3988 (1700) |
| 2   3.7 | 13 | 600 | Irganox B 225 (1000) | 1000 | Millad 3988 (1700) |
| 3   3.7 | 13 | 600 | Vitamin E (100) + Doverphos S-9228 (500) | 400 | ADK-STAB NA21 (1700) | comparative example

Production of Polypropylene Compositions

Composition 1 (Comparative)

The unimodal random PP copolymer present in this composition is commercially available, e.g. from Borealis AG. The additives were blended with the copolymer in a conventional manner using an extruder.

Compositions 2 and 3

These compositions both comprise the same bimodal random PP copolymer, but a different mixture of additives.

The bimodal random PP copolymer is prepared according to the process described in EP0887379 using the conditions shown in the table below. The catalyst used is made according to example 8 of WO2004/029112, but using diethyl aluminium chloride (DEAC) instead of triethyl aluminium (TEA).

|  | 2 and 3 |
| --- | --- |
| Al/D (mol/mol) | 10/10 |
| Loop/GPR Split % | 53/47 |
| Loop |  |
| Temperature (° C.) | 70 |
| MFR2 (g/10 min) | 13 |
| Ethylene content (wt-%) | 2.9 |
| GPR |  |
| Temperature (° C.) | 80 |

The additives were blended with the copolymer in the conventional manner using an extruder.

The properties of each of the final compositions is shown in the Table below.

|  | 1# | 2 | 3 |
| --- | --- | --- | --- |
| Ethylene content (wt-%) | 3.0 | 3.7 | 3.7 |
| MFR2 (g/10 min) | 13 | 13 | 13 |
| XS (%) | 5.5 | 6.5 | 6.5 |
| Tm (° C.) | 145 | 145 | 145 |
| Tc (° C.) | 120 | 117 | 117 |

Example 1-Injection Moulding to Form Caps

The caps were moulded in an injection moulding machine under conventional conditions known to the skilled person in the art.

The closing efficiency of each cap was determined. The total VOC, haze, shelf life and organoleptic performance of each polypropylene composition was also determined. The results are shown in the Table below.

|  | 1# | 2 | 3 |
| --- | --- | --- | --- |
| C2 (% wt) | 3.0 | 3.7 | 3.7 |
| Haze (%) | 22 | 19 | 19 |
| Total VOC (ppb) | 1 | 1 | 5 |
| Shelf Life (hr) |  | 500 | <24 |
| Organoleptics | No significant difference detected | No significant difference detected | No significant difference detected |
| Closing Efficiency | Acceptable | Very good | Good |

The invention claimed is:

1. A cap or closure comprising a polypropylene composition, wherein said composition comprises:
   (i) a multimodal random propylene ethylene copolymer having an ethylene content of 3.3-7% wt wherein said multimodal random propylene ethylene copolymer comprises two different propylene copolymers,
   (ii) 0.01 to 0.3% wt of a non-polymeric nucleating agent, and
   (iii) a sterically hindered phenol antioxidant in the amount of 0.01 to 1 wt %.

2. A cap or closure as claimed in claim 1, wherein the melt flow rate of the composition is 5 to 30 g/10 min.

3. A cap or closure as claimed in claim 1, wherein said composition comprises an antistatic agent.

4. A cap or closure as claimed in claim 1, wherein said composition comprises an acid scavenger.

5. A cap or closure as claimed in claim 1, wherein said composition comprises an antistatic agent and an acid scavenger.

6. A cap or closure as claimed in claim 1 for use in the food or drinks industry.

7. A cap or closure as claimed in claim 1 which is a screw cap.

8. A cap or closure as claimed in claim 1, wherein the haze of said composition is less than 25%.

9. A cap or closure as claimed in claim 1, wherein the multimodal random propylene ethylene copolymer having an ethylene content of 3.3 to 6.5% wt.

* * * * *